(12) United States Patent
Kaskari et al.

(10) Patent No.: US 10,762,417 B2
(45) Date of Patent: *Sep. 1, 2020

(54) EFFICIENT CONNECTIONIST TEMPORAL CLASSIFICATION FOR BINARY CLASSIFICATION

(71) Applicant: SYNAPTICS INCORPORATED, San Jose, CA (US)

(72) Inventors: Saeed Mosayyebpour Kaskari, Irvine, CA (US); Trausti Thormundsson, Irvine, CA (US); Francesco Nesta, Aliso Viejo, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/894,872

(22) Filed: Feb. 12, 2018

(65) Prior Publication Data

US 2018/0232632 A1 Aug. 16, 2018

Related U.S. Application Data (60) Provisional application No. 62/457,678, filed on Feb. 10, 2017.

(51) Int. Cl.
*G10L 15/00* (2013.01)
*G06N 3/04* (2006.01)
(Continued)

(52) U.S. Cl.
CPC .......... *G06N 3/049* (2013.01); *G06N 3/0445* (2013.01); *G06N 3/084* (2013.01); *G10L 15/063* (2013.01);
(Continued)

(58) Field of Classification Search
CPC ...................................................... G10L 15/00
(Continued)

(56) References Cited

U.S. PATENT DOCUMENTS

| | | | | |
|---|---|---|---|---|
| 5,155,763 A | * | 10/1992 | Bigus | G06N 3/105 379/111 |
| 5,630,023 A | * | 5/1997 | Oteki | G06F 7/68 706/41 |

(Continued)

OTHER PUBLICATIONS

Fernández, Santiago, et al., "An application of recurrent neural networks to discriminative keyword spotting," Proceedings of the 17$^{th}$ International Conference on Artificial Neural Networks (ICANN'07), Sep. 9-13, 2007, pp. 220-229, Porto, Portugal.

(Continued)

*Primary Examiner* — Michael Colucci
(74) *Attorney, Agent, or Firm* — Haynes and Boone, LLP (57) ABSTRACT

A classification system and method for training a neural network includes receiving a stream of segmented, labeled training data having a sequence of frames, computing a stream of input features data for the sequence of frames, and generating neural network outputs for the sequence of frames in a forward pass through the training data and in accordance weights and biases. The weights and biases are updated in a backward pass through the training data, including determining Region of Target (ROT) information from the segmented, labeled training data, computing modified forward and backward variables based on the neural network outputs and the ROT information, deriving a signal error for each frame within the sequence of frames based on the modified forward and backward variables, and updating the weights and biases based on the derived signal error. An adaptive learning module is provided to improve a convergence rate of the neural network.

20 Claims, 7 Drawing Sheets

Backward pass (51) Int. Cl.
*G06N 3/08* (2006.01)
*G10L 15/16* (2006.01)
*G10L 15/06* (2013.01)
*G10L 15/22* (2006.01)

(52) U.S. Cl.
CPC ............. *G10L 15/16* (2013.01); *G10L 15/22* (2013.01); *G10L 2015/223* (2013.01)

(58) Field of Classification Search
USPC .... 704/232, 219, 203, 201, 230; 706/41, 12, 706/26; 714/748
See application file for complete search history.

(56) References Cited

U.S. PATENT DOCUMENTS

| | | | | |
|---|---|---|---|---|
| 6,041,299 | A * | 3/2000 | Schuster | G10L 15/16 704/232 |
| 6,470,261 | B1 * | 10/2002 | Ng | G06N 3/086 701/117 |
| 6,615,382 | B1 * | 9/2003 | Kang | H04L 1/0009 714/748 |
| 6,728,404 | B1 * | 4/2004 | Ono | G06K 9/3241 382/118 |
| 7,110,526 | B1 * | 9/2006 | Dezonno | H04M 3/5232 379/265.02 |
| 8,675,839 | B1 * | 3/2014 | Noble, Jr. | H04M 3/5175 379/112.08 |
| 9,191,304 | B1 * | 11/2015 | Plate | H04L 12/6418 |
| 9,723,144 | B1 * | 8/2017 | Gao | H04M 3/5158 |
| 10,013,640 | B1 * | 7/2018 | Angelova | G06K 9/4628 |
| 10,114,554 | B1 * | 10/2018 | Gonzalez | G06F 3/061 |
| 2003/0115041 | A1 * | 6/2003 | Chen | G10L 19/02 704/200.1 |
| 2003/0225786 | A1 * | 12/2003 | Hall | G06N 5/025 |
| 2005/0216426 | A1 * | 9/2005 | Weston | G06K 9/6215 706/12 |
| 2005/0261898 | A1 * | 11/2005 | Van Klinken | H03H 21/0012 704/219 |
| 2010/0198054 | A1 * | 8/2010 | Ewing | A61B 5/055 600/420 |
| 2011/0224975 | A1 * | 9/2011 | Li | G10L 19/08 704/203 |
| 2015/0381809 | A1 * | 12/2015 | Fleming | H04M 3/5158 379/265.11 |
| 2016/0048766 | A1 * | 2/2016 | McMahon | G06N 5/047 706/12 |
| 2017/0005644 | A1 * | 1/2017 | Sayeh | G02F 1/00 |
| 2017/0083829 | A1 * | 3/2017 | Kang | G06N 3/0454 |
| 2017/0148431 | A1 * | 5/2017 | Catanzaro | G10L 15/14 |
| 2017/0249551 | A1 * | 8/2017 | Iljazi | G06F 3/0619 |
| 2017/0344829 | A1 * | 11/2017 | Lan | G06N 3/0445 |
| 2017/0372197 | A1 * | 12/2017 | Baughman | G06N 3/088 |
| 2018/0203848 | A1 * | 7/2018 | Perez | G10L 25/30 |
| 2018/0233130 | A1 * | 8/2018 | Kaskari | G10L 15/063 |
| 2018/0253648 | A1 * | 9/2018 | Kaskari | G06N 3/084 |

OTHER PUBLICATIONS

Geiger, Jürgen T., et al., "Robust Speech Recognition using Long Short-Term Memory Recurrent Neural Networks for Hybrid Acoustic Modelling," Interspeech, Sep. 14-18, 2014, pp. 631-635, Singapore.

Graves, Alex, et al., "Connectionist Temporal Classification: Labelling Unsegmented Sequence Data with Recurrent Neural Networks," Proceedings of the 23$^{rd}$ International Conference on Machine Learning, 2006, pp. 369-376, Pittsburgh, Pennsylvania.

Graves, Alex, et al., "Framewise Phoneme Classification with Bidirectional LSTM and Other Neural Network Architectures," Neural Networks, Jul.-Aug. 2005, pp. 602-610, vol. 18, Issues 5-6.

Wöllmer, Martin, et al., "Bidirectional LSTM Networks for Context-Sensitive Keyword Detection in a Cognitive Virtual Agent Framework," Cognitive Computation, 2010, pp. 180-190, vol. 2, Issue 3, Springer-Verlag.

Wöllmer, Martin, et al., "Improving Keyword Spotting with a Tandem BLSTM-DBN Architecture," Proceedings of the 2009 International Conference on Advances in Nonlinear Speech Processing (NOLISP'09), Jun. 25-27, 2009, pp. 68-75, Vic, Spain.

Wöllmer, Martin, et al., "Robust Vocabulary Independent Keyword Spotting with Graphical Models," Workshop on Automatic Speech Recognition & Understanding (ASRU), 2009, pp. 349-353, IEEE, Merano, Italy.

Wöllmer, Martin, et al., "Spoken Term Detection with Connectionist Temporal Classification: a Novel Hybrid CTC-DBN Decoder," International Conference on Acoustics, Speech, and Signal Processing (ICASSP), Mar. 14-19, 2010, pp. 5274-5277, IEEE, Dallas, Texas.

Zeiler, Matthew D., "Adadelta: An Adaptive Learning Rate Method," CoRR, 2012, 6 Pages, arXiv:1212.5701.

Rose et al., "A Hidden Markov Model Based Keyword Recognition System," Proc. of ICASSP, 1990, pp. 129-132, IEEE.

Wöllmer et al., "Keyword spotting exploiting Long Short-Term Memory," Speech Communication, 2013, pp. 252-265, vol. 55, Elsevier.

* cited by examiner

FIG. 1
Forward Pass

FIG. 2
Backward pass

EFFICIENT CONNECTIONIST TEMPORAL CLASSIFICATION FOR BINARY
CLASSIFICATION

CROSS-REFERENCE TO RELATED APPLICATIONS

This application claims the benefit of and priority to U.S. Provisional Patent Application No. 62/457,678 filed Feb. 10, 2017 and entitled "EFFICIENT CONNECTIONIST TEMPORAL CLASSIFICATION (CTC) ALGORITHM FOR BINARY CLASSIFICATION" which is incorporated herein by reference in its entirety.

TECHNICAL FIELD

The present disclosure generally relates to information classification, and more particularly, for example, to binary classification systems and methods for use in speech recognition systems.

BACKGROUND

Binary classification is the task of classifying the elements of a given set into two groups on the basis of a classification rule. There are several applications for binary classification, such as medical testing indicating whether or not a patient has a certain disease, quality control in factories where the product is tested to determine whether or not it meets a product specification, and a keyword spotting system where a system is designed to detect a voice command.

In many binary classification applications, the overall accuracy of the classification result may not be as important as the relative proportion of different error types. For example, in medical application a false positive (detecting a disease when it is not present) is considered differently from a false negative (not detecting a disease when it is present). There are several binary classification methods that may be used to solve this type of problem including decision trees, Bayesian networks, support vector machines, neural networks, prohibit regression, and logistic regression.

Among different methods, neural networks have been widely used because performance is sufficient to solve a wide variety of tasks that are hard to solve using the other methods. However, such approaches are often highly complex and may not be practical for use in many low power devices such as mobile phones. Efforts to reduce complexity often come at the cost of less flexibility, memory inefficiencies, and other undesirable performance measures. Thus, there is a need in the art for solutions to optimize binary classification systems that are both fast and resource efficient.

SUMMARY

The present disclosure provides systems and methods that address a need in the art for improved binary classification. In various embodiments, a computer-implemented method for training a neural network includes receiving, at a computing device, a stream of segmented, labeled training data having a sequence of frames, computing, by the computing device, a stream of input features data for the sequence of frames, generating, by the computing device, neural network outputs for the sequence of frames in a forward pass through the training data and in accordance weights and biases, and updating, by the computer device, weights and biases in a backward pass through the training data. The backward pass includes determining Region of Target (ROT) information from the stream of segmented, labeled training data, computing modified forward and backward variables based on the neural network outputs and the ROT information, deriving a signal error for each frame within the sequence of frames based on the modified forward and backward variables, and updating the weights and biases based on the derived signal error. The method may further include adaptively learning to improve a convergence rate of the neural network by determining a momentum for the weights and biases of an output layer, and computing the root mean square of gradients for the weights and biases not in the output layer.

In some embodiments, the neural network includes a recurrent neural network, such as a Long Short-Term Memory (LSTM) network, and the method includes storing the neural network outputs for the sequence of frames in a buffer. The backward pass may further include starting from a last frame in the sequence of frames and going backward in time to compute the signal error for each frame at the input of a softmax node. In some embodiments the method further includes propagating the signal error backwards through the neural network using back propagation through time.

In some embodiments, each sequence of frames includes a ROT, determining the ROT information further comprises determining a beginning of the ROT and determining an end of the ROT, and ROT information is used to compute the signal error. The signal error may be computed based on network outputs and an estimated soft target.

In various embodiments, a classification training system includes a neural network operable to classify input data, a training dataset providing segmented labeled training data comprising a sequence of frames, and a classification training module operable to train the neural network using the segmented labeled training data, the classification training module comprising a forward pass processing module and a backward pass processing module. The forward pass processing module may be operable to train the neural network by generating neural network outputs for the training data using weights and biases for the neural network. The neural network may include a recurrent neural network, such as an LSTM network. The forward pass processing module may be further operable to store the neural network outputs for the frames in the sequence of frames in a buffer. An adaptive learning module may be provided to improve a convergence rate of the neural network by determining a momentum for the weights and biases of an output layer, and computing the root mean square of gradients for the weights and biases not in the output layer.

In one or more embodiments, the backward pass processing module is operable to train the neural network by updating the weights and biases by passing backward through generated neural network outputs, the backward pass processing module operable to determine Region of Target (ROT) information from the segmented, labeled training data, compute modified forward and backward variables based on the neural network outputs and the ROT information, derive a signal error for each frame within the sequence of frames based on the modified forward and backward variables, and update the weights and biases based on the derived signal error. The backward pass processing module may further be operable to start from a last frame in the sequence of frames and going backward in time to compute the signal error for each frame at an input of a softmax node, and propagate the signal error backwards through the neural network using back propagation through time.

In some embodiments, each sequence of frames includes a ROT, and the backward pass processing module is further operable to determine a beginning of the ROT and an end of the ROT, and use the ROT information to compute the signal error. The signal error may be computed based on network outputs and an estimated soft target.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. The included drawings are for illustrative purposes and serve only to provide examples of possible systems and methods for the disclosed methods and systems. These drawings in no way limit any changes in form and detail that may be made to that which is disclosed by one skilled in the art without departing from the spirit and scope of this disclosure.

DETAILED DESCRIPTION

In accordance with various embodiments of the present disclosure, systems and methods for binary classification are disclosed.

A common solution for the task of binary classification such as keyword spotting is to use Hidden Markov Models (HMM) (e.g., see the publication titled "An application of recurrent neural networks to discriminative keyword spotting" by Santiago Fernandez, Alex Graves and Jurgen Schmidhuber, in Proceedings of ICANN. Porto. pp 220-229 (2007), which is incorporated by reference herein in its entirety). A major difficulty with HMM based systems is that they are forced to model the garbage (i.e. non-keyword) parts of the signal as well as the keywords themselves. Further disadvantages of HMM modeling are the suboptimal convergence of the Expectation Maximization (EM) algorithm to local maxima, the assumption of conditional independence of the observations, and the fact that HMMs do not directly maximize the keyword detection rate.

Among the recurrent neural networks, Long Short-Term Memory (LSTM) or bidirectional LSTM (BLSTM) networks are a promising technique for improving context modeling to build a better keyword spotting system. The methods using LSTM networks can be divided in two categories. The first category uses the LSTM network to provide higher level features for a classifier like Dynamic Bayesian Network (DBN) to perform keyword spotting (see, e.g., the publication titled "Improving Keyword Spotting with a Tandem BLSTM-DBN Architecture," by M. Wollmer, F. Eyben, A. Graves, B. Schuller and G. Rigoll, in Non-Linear Speech Processing, J. Sole-Casals and V. Zaiats (Eds.), LNAI 5933, pp. 68-75, Springer Heidelberg, 2010; the publication titled "Bidirectional LSTM networks for context-sensitive keyword detection in a cognitive virtual agent framework" by M. Woellmer, F. Eyben, A. Graves, B. Schuller, and G. Rigoll, in Cognitive Computation, Special Issue on Non-Linear and Non-Conventional Speech Processing, 2010; and the publication titled "Spoken term detection with connectionist temporal classification—a novel hybrid CTC-DBN approach" by M. Woellmer, F. Eyben, B. Schuller, and G. Rigoll, in Proc. of ICASSP, Dallas, Tex., 2010, pp. 5274-5277, which are incorporated by reference herein in their entirety). These approaches combine the flexibility of the classifier like DBN architecture with the ability of a BLSTM network to capture long-range time dependencies. This category of methods has the flexibility of defining new keywords without retraining the network and thereby does not require excessive amounts of training data for large vocabularies. However, such methods have high complexity due to the large network (e.g., a BLSTM network) which provides higher level features such as phoneme recognitions for a keyword spotting task. Therefore, these methods are not practical for use in low power devices such as mobile phones.

The second category of methods using LSTM networks exploit LSTM in combination with Connectionist Temporal Classification (CTC) which is a discriminative system based on recurrent neural networks that use information from long time spans to estimate keyword probabilities. In a keyword spotting task, for example, the method attempts to model full keywords in the sequence data stream, while the first category systems are based on sub-word units (phonemes) (see, e.g., the publication titled "An application of recurrent neural networks to discriminative keyword spotting" by Santiago Fernandez, Alex Graves and Jurgen Schmidhuber, in: Proceedings of ICANN. Porto. pp 220-229 (2007) and the publication titled "Keyword spotting exploiting Long Short-Term Memory" by M. Wollmer, B. Schuller, and G. Rigoll, Speech Communication, 2012, which are incorporated by reference herein in their entirety). Unlike the methods in the first category, these methods are not flexible to new keyword selection in a keyword spotting task and require sufficient keyword samples in the training data. The conventional solution using LSTM based on CTC has some limitations such as unnecessary high computational complexity for binary classification and the method is not memory efficient.

For many binary classifications such as keyword spotting, the CTC training is more appropriate than the frame-wise training. First, the trained system is ideally expected to have only one or more spikes anywhere during the keyword duration indicating the detection of the keyword. So the system does not need to produce spikes at all the frames of the keyword. This leads to better system training that provides better performance as it is shown in the publication "An application of recurrent neural networks to discriminative keyword spotting" by Santiago Fernandez, Alex Graves and Jurgen Schmidhuber, which is incorporated by reference herein in its entirety. A CTC network may be designed to fulfill this by maximizing the probability of having correct labeling over all possible labeling. On the other hand, frame-wise training may be designed to force the network to produce spikes at all the frames of the keyword.

Second, frame-wise training is often very sensitive to the alignment of labeled training data. This means that the training data should be correctly labeled consistently across all data. However this requirement is not essential in CTC training which doesn't require pre-segmented training data. Finally, a network using a frame-wise algorithm is typically trained to make a series of independent label classifications. This implies that the network output is post processed to give the final label sequence.

Although CTC training has several advantages over frame-wise training especially for binary classification, the conventional CTC training algorithm is not computationally efficient and it has some problems and limitations such as an underflow problem for the computation and it can have undesirable latency. It is contemplated that the embodiments described herein present a better solution to train an artificial neural network, such as an LSTM network, for binary classification that overcomes the above identified limitations and that provides better performance. One difference between the embodiments presented herein and the conventional solution for training a CTC network is that pre-segmented labeled data is used. This information is used to propose a more computational efficient algorithm for training and it can also lead to better performance.

The embodiments described herein have several advantages over conventional methods utilizing LSTM for binary classification. First, the CTC network such as the one proposed in the publication titled "Connectionist temporal classification: labelling unsegmented sequence data with recurrent neural nets" by Graves, A., Fernandez, S., Gomez, F., Schmidhuber, J, computes two variables, namely the forward and backward variables, recursively for the entire input sequence. This increases the computational complexity of the method because of the high number of multiplications with small valued numbers ranging between zero and one. The embodiments described herein simplify the computation of these variables and are well designed for the application of binary classification to train an LSTM network efficiently.

Second, in a binary classification such as a keyword spotting task, it is desirable to build a system to predict that an occurrence of a keyword exists towards the ending of the occurrence of the keyword. Otherwise, the system can have high false-detections for the case of non-keywords containing part of the keyword (e.g. the beginning of a non-keyword is the same as the beginning of the keyword). Conventionally trained CTC networks, such as the one proposed in the publication "Connectionist temporal classification: labelling unsegmented sequence data with recurrent neural nets" by Graves, A., Fernandez, S., Gomez, F., Schmidhuber, J. cannot guarantee that the trained system will predict the keyword towards the ending of its occurrence since the network is forced to maximize the correct output labeling regardless of the alignment. In contrast, the embodiments described herein do not have this limitation; the trained network using the methods described herein can predict the true keyword towards the ending of the keyword.

Third, existing methods utilizing a CTC network have high memory requirements during training since they operate by obtaining the network's output for the entire input sequence as well as recursively computing the forward and backward variables of the same length of input sequence. For the task of keyword spotting, for example, when the input sequence is very long, the conventional methods, such as the methods proposed in the publication titled "Connectionist temporal classification: labelling unsegmented sequence data with recurrent neural nets" by Graves, A., Fernandez, S., Gomez, F., Schmidhuber, J., are not memory efficient. In contrast, the training methods of some embodiments described herein are memory efficient; in one embodiment, the training method updates the network frame-wise for non-keyword parts of the input sequence and it concentrates on a particular region, which is called a Region of Target (ROT), that can include the tail of the keyword.

Figure 1:
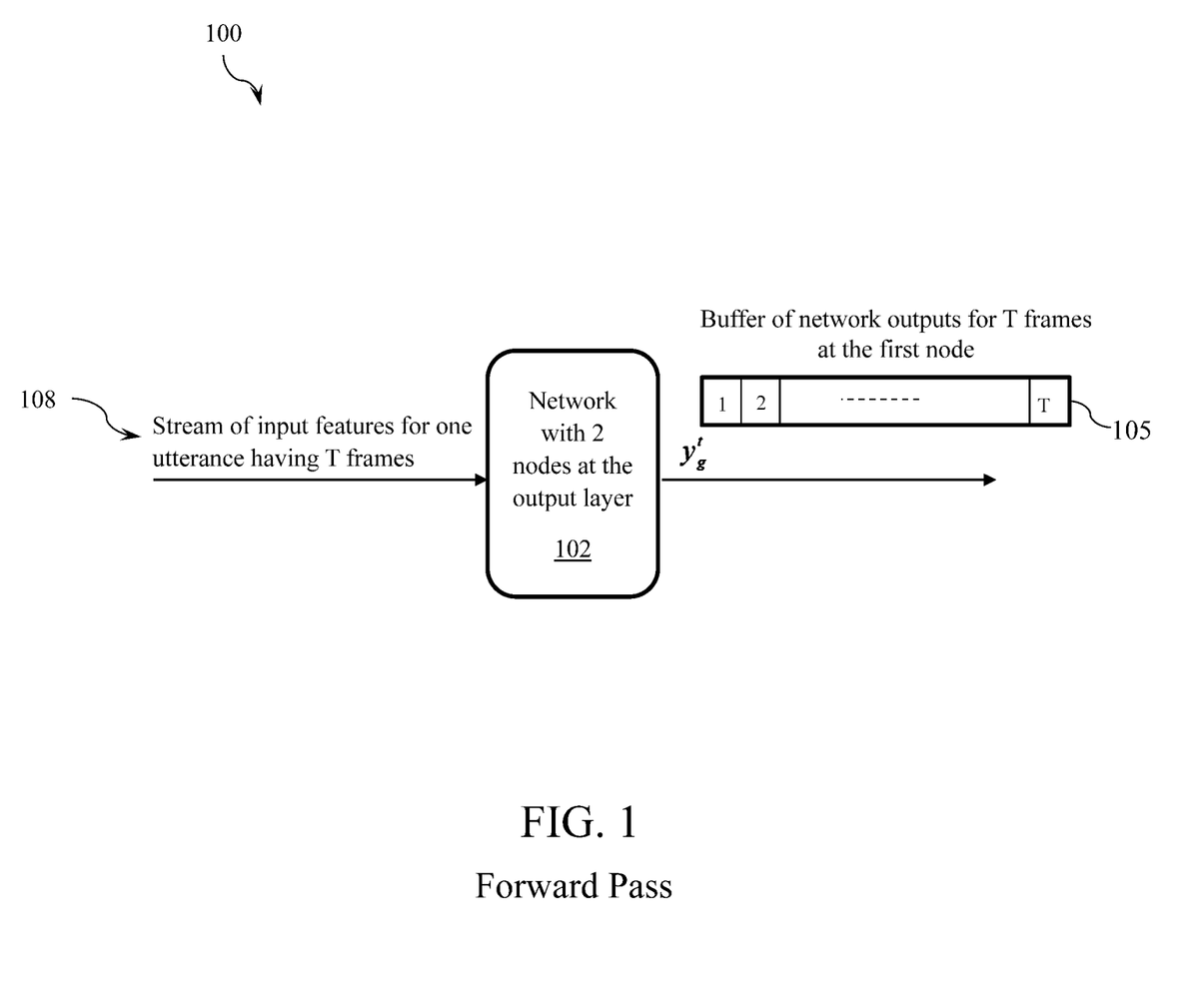
FIG. 1 illustrates an exemplary binary classification system for performing a forward pass on training data to train an artificial neural network, in accordance with an embodiment.
Figure 2:
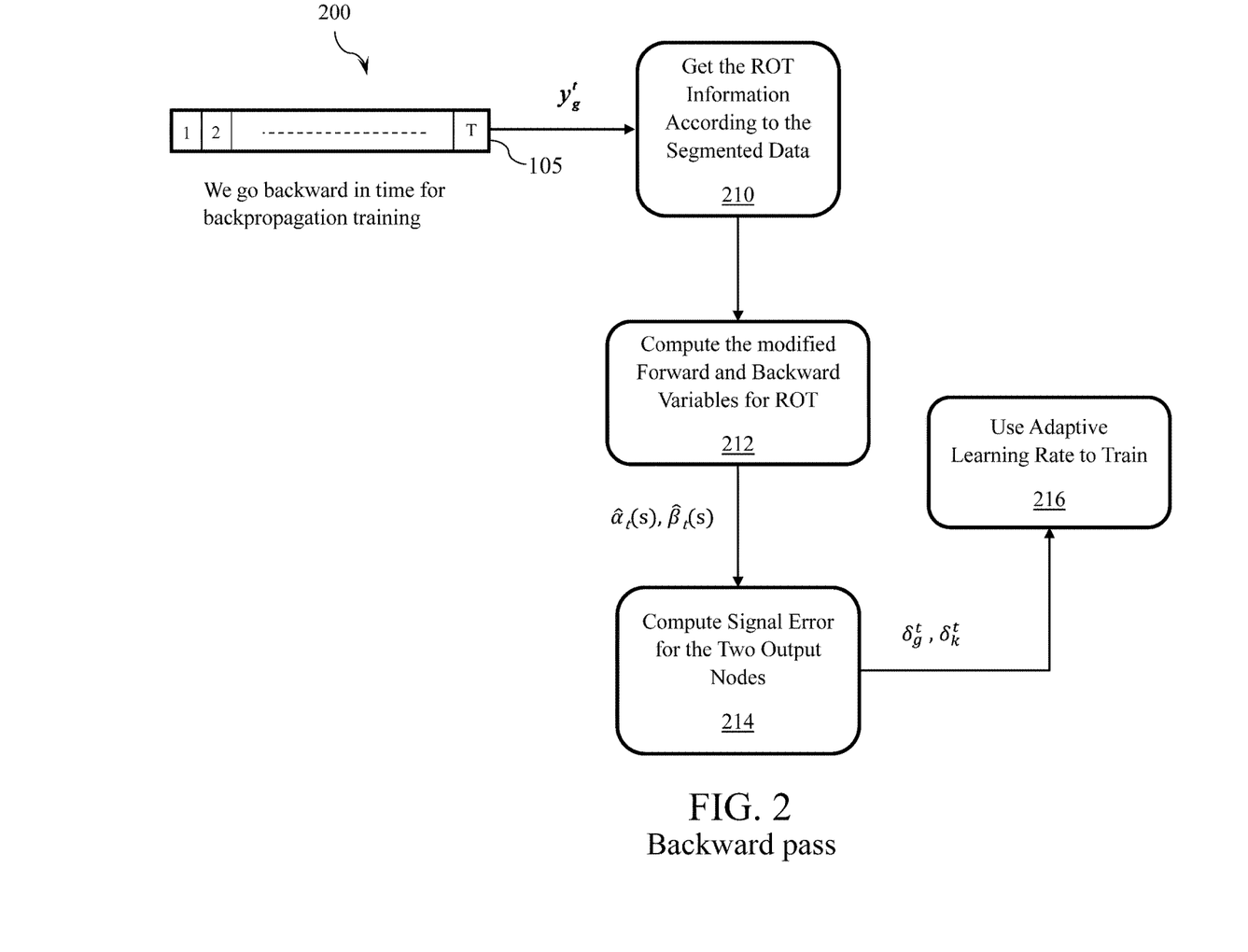
FIG. 2 illustrates an exemplary binary classification system for performing a backward pass on training data to train an artificial neural network, in accordance with an embodiment.
Figure 3:
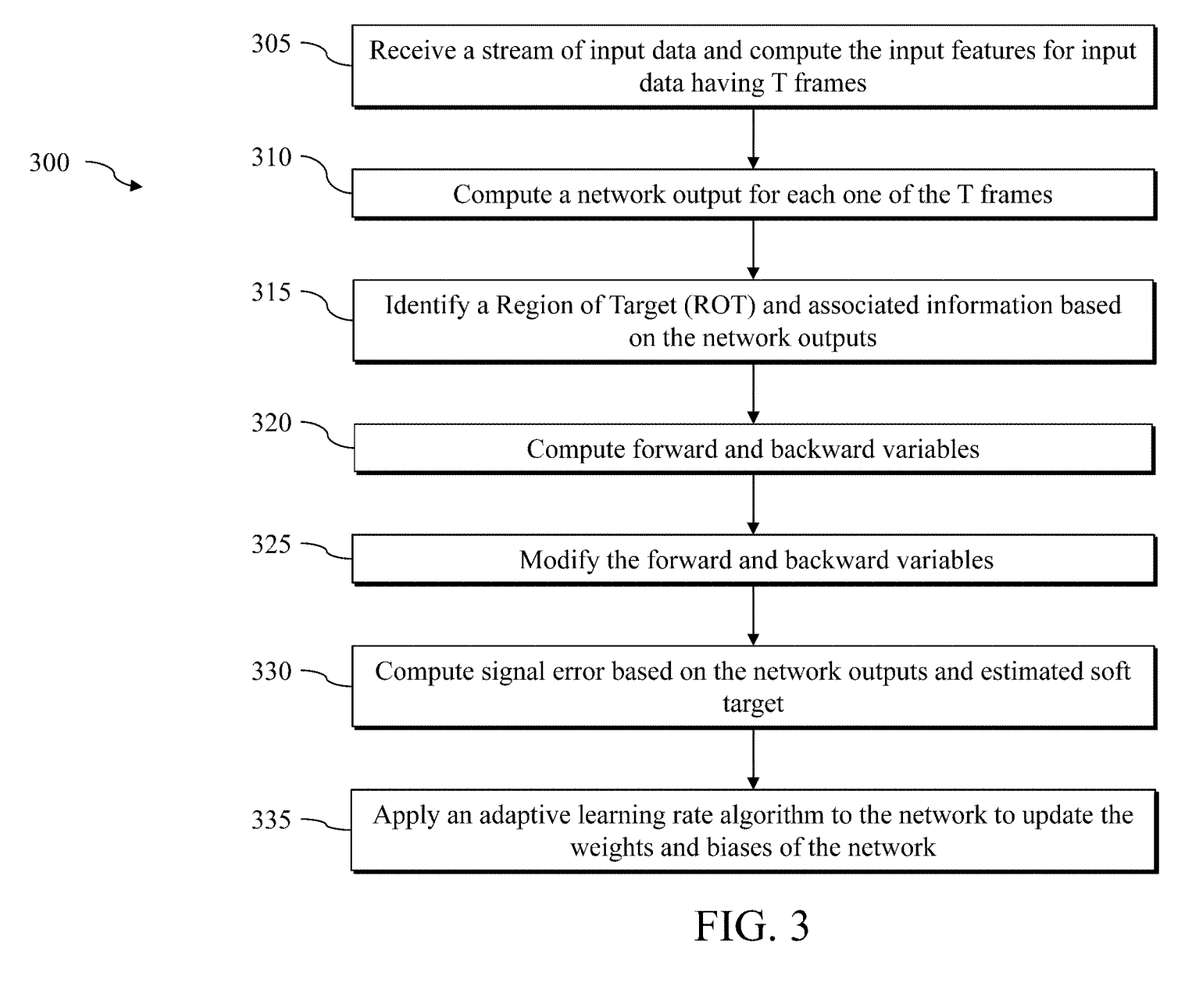
FIG. 3 is a flow diagram illustrating an exemplary operation of a binary classification training process, in accordance with an embodiment.

Referring to FIGS. 1 and 2, an embodiment of a general structure of the proposed system and process to train a recurrent neural network 102, such as an LSTM network, for binary classification will now be described. FIG. 1 illustrates the general structure of the binary classification system of some embodiments during an initial forward pass process while FIG. 2 illustrates the general structure of the binary classification system of some embodiments during a subsequent backward pass process. FIG. 3 illustrates the training process 300 performed by the binary classification system of some embodiments using an artificial neural network, such as an LTSM network.

The training procedure will be first briefly discussed below by reference to FIGS. 1-3. The procedure will then be described in more detail in the subsections below. The training process 300 includes a forward pass process 100 and a backward pass process 200.

In the forward pass process, a stream of input features 108 having a sequence of T frames is received (at step 305 of FIG. 3). The stream of input can include audio input received from an audio inputting device (e.g., a microphone) over a period of time. Optionally, the process 300 may slice the input into a sequence of frames (e.g., a sequence of frames 108 of FIG. 1 having T number of frames in the order of receipt), with each frame having the same duration. Next, the input features for each frame of input are calculated at step 305 of FIG. 3. The process 300 then uses a neural network to compute (at step 310 of FIG. 3) the network outputs for all the two nodes $(y^t_g, y^t_k=1-y^t_g)$ at t-th frame of a sequence of training data (e.g., the process 300 computes a network output utilizing an existing artificial neural network for each one of the T frames). In one embodiment, the binary classification system is configured to classify 2 classes, and the neural network includes 2 nodes at the output layer. The process may compute the network output in an order that is consistent with the sequence of the frames. In some embodiments, the network outputs for all the frames within the sequence are stored in a buffer 105.

The backward pass process of some embodiments starts from the last frame and propagates backwards in time to compute a signal error for each frame at the input of a softmax node. Then, the backward pass process propagates this error backwards through the unfolded net, for example, by using the standard Back Propagation Through Time (BPTT) equations (see, e.g., the publication titled "Connectionist temporal classification: labelling unsegmented sequence data with recurrent neural nets" by Graves, A., Fernandez, S., Gomez, F., Schmidhuber, J., which is incorporated by reference in its entirety as if fully set forth herein).

In the illustrated embodiment, the backward pass process has several steps as follows. Initially, for each sequence of data (e.g., a sequence of frames), the process 300 identifies (at step 315 of FIG. 3) a Region Of Target (ROT) within the sequence of input frames and derives associated information of the ROT (see also, reference 210, FIG. 2). The beginning and the end of this ROT is used to compute the signal error. Using the ROT information, the process 300 computes (at step 320 of FIG. 3) forward and backward variables for the sequence of input data.

Then, the process 300 (at step 325 of FIG. 3) modifies the forward and backward variables to generate modified forward and backward variables. Next, the process 300 (at step 330 of FIG. 3) computes a signal error based on the network outputs and the estimated soft target ($Y^t_g$ in Formula (5) as described below). At step 335 of FIG. 3, an adaptive learning algorithm may be used to update the weights and biases of the neural network.

A conventional CTC network proposed in the publication titled "Connectionist temporal classification: labelling unsegmented sequence data with recurrent neural nets" by Graves, A., Fernandez, S., Gomez, F., Schmidhuber, J. includes a softmax output layer with one more output node than there are labels. If the number of labels is M, then the activations of the first M output nodes are interpreted as the probabilities of observing the corresponding labels at particular times. The activation of the extra node is the probability of observing a 'blank', or no label. The network outputs define the probabilities of all possible ways of aligning all possible label sequences with the input sequence. The total probability of any one label sequence can then be found by summing the probabilities of its different alignments. The goal of the CTC algorithm is to maximize the probabilities of the correct labeling. However, for applications such as keyword spotting where there are only two classes (keyword and garbage), such a CTC algorithm is not efficient because the CTC network would be required to have three nodes including the extra blank node and the forward and backward variables are required to be computed for the entire training sequence. As a result, the aforementioned method is not memory and computationally efficient.

Figure 4:
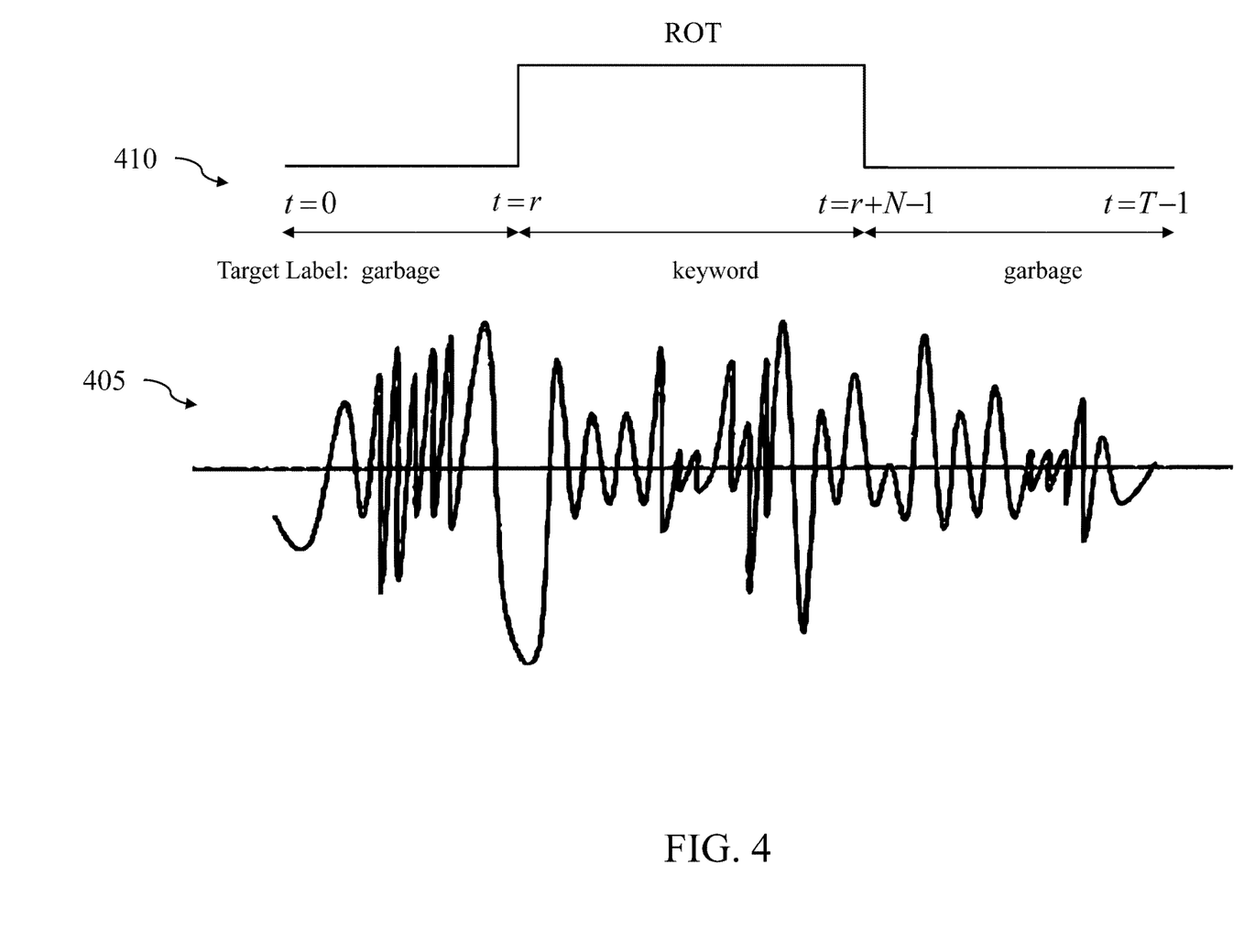
FIG. 4 illustrates an exemplary sequence of input data separated into multiple frames, in accordance with an embodiment.

In some embodiments disclosed herein, a binary classification system using an improved CTC algorithm is contemplated. An example for a keyword spotting application is illustrated in FIG. 4 and is used below for the purpose of illustrating this approach, and does not limit the application of this binary classification system. FIG. 4 illustrates an example input in the form of an audio waveform 405. The audio waveform 405 is a representation of an audio input across a period of time frame, which can be obtained via an audio input device such as one or more microphone. Upon receiving the audio waveform 405, the binary classification system of some embodiments divides the audio waveform 405 into a sequence of audio frames 410 (e.g., T number of frames in order). Preferably, each frame in the sequence of audio frames includes substantially equal time duration. In this example, we have a keyword from Frame t=r to Frame t=r+N−1 and the other part (the other frames) of this sequence is not the keyword (it is garbage). The keyword region is known as the Region Of Target (ROT), as it is shown in FIG. 4. The binary system of some embodiments produces at least one spike anywhere during this region using an existing artificial neural network (e.g., an existing LSTM network stored within the memory of the binary classification system). It can be a single spike or multiple spikes. In practice, the ROT can be considered the tail of the keyword since the spike should be produced almost at the end of the keyword. A goal is to maximize the probability of having one or multiple spikes in the ROT and to get zero all non-ROT. Next, the proposed CTC algorithm using the ROT information is presented.

1) Compute the Modified Forward and Backward Variables (See, Reference 212, FIG. 2)

As mentioned before, for binary classification such as the example of FIG. 4, there are only two classes, e.g. keyword and garbage. An illustration of the forward and backward algorithms applied to the labeling in the ROT of FIG. 4 is shown in FIG. 5.

Figure 5:
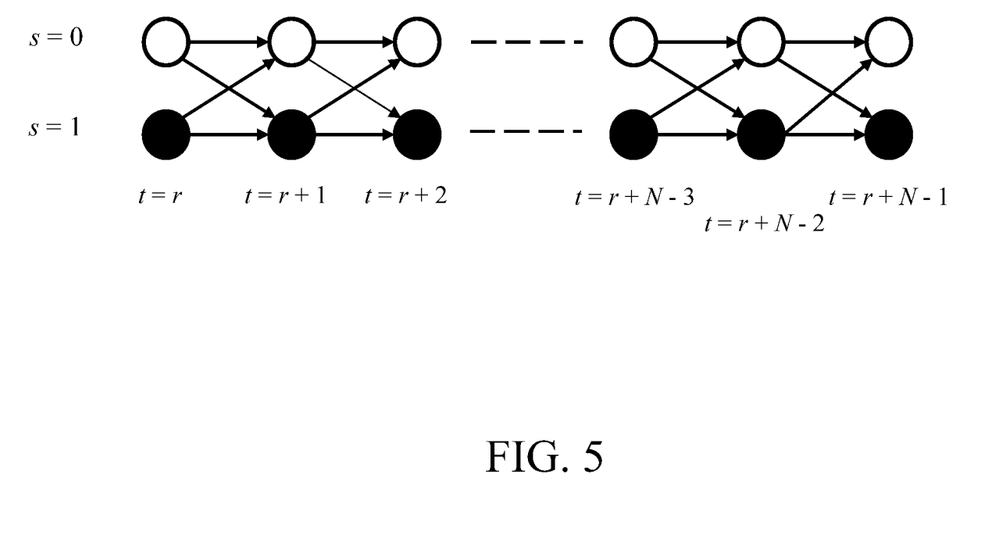
FIG. 5 illustrates an exemplary application of a training process on a sequence of input data, in accordance with an embodiment.

FIG. 5 illustrates a binary system of some embodiments labeling each frame in the ROT region of the sequence of inputs. In FIG. 5, the black (solid) circles represent indications of the keyword and the white (hollow) circles represent indication of the garbage in the sequence of inputs. The arrows represent different transitions that the binary system can traverse to form different paths across the sequence. As mentioned above, the goal is to maximize the probability of having at least one spike in the ROT. The paths shown in FIG. 5 that have at least one black circle are valid paths for this region. As there are only two classes, the forward and backward variables are two-dimensional matrixes. Also in the illustrated embodiment the forward and backward variables are computed only for the ROT. In some embodiments, these variables can be computed in logarithm domain using the proposed algorithm as given below.

a. Forward Variable Calculation in Logarithm Domain for ROT initialization formula (1)

$\hat{\alpha}_r(0) = \log(y^r_g)$ $\hat{\alpha}_r(1) = \log(1 - y^r_g)$ recursion formula ($r < t \leq r + N - 1$)

$$\hat{\alpha}_t(s) = \begin{cases} A + \log(y^t_g) & \text{if } \mod(s, 2) == 0 \\ A + \log(1 - y^t_g) & \text{otherwise} \end{cases}$$

$A = \log(\exp(\hat{\alpha}_{t-1}(s)) + \exp(\hat{\alpha}_{t-1}(s - 1)))$ b. Backward Variable Calculation in Logarithm Domain for ROT initialization formula (2)

$\hat{\beta}_{r+N-1}(0) = \log(y^{r+N-1}_g)$ $\hat{\beta}_{r+N-1}(1) = \log(1 - y^{r+N-1}_g)$ recursion formula ($r \leq t < r + N - 1$)

$$\hat{\beta}_t(s) = \begin{cases} A + \log(y^t_g) & \text{if } \mod(s, 2) == 0 \\ A + \log(1 - y^t_g) & \text{otherwise} \end{cases}$$

$A = \log(\exp(\hat{\beta}_{t+1}(s)) + \exp(\hat{\beta}_{t+1}(s + 1)))$ where $\hat{\alpha}_t(s)$ and $\hat{\beta}_t(s)$ are the modified of forward and backward variables in logarithm domain, respectively, and $y^t_d$ is the output of the network for garbage node at t-th frame.

2) Compute Signal Error for the Two Output Nodes (See, Reference 214, FIG. 2)

In this section, an embodiment of how to efficiently compute the signal error at each of the two nodes of the network output is discussed. In various embodiments, the signal error at each of the two nodes of the network output is computed before applying a softmax nonlinear function. It is assumed that the network output for garbage (keyword) at frame t before and after the softmax nonlinear function are denoted by $z^t_g$ ($z^t_k$) and $y^t_g$ ($y^t_k = 1 - y^t_g$), respectively. The relationship between $z^t_g$ and $y^t_g$ is given below.

$$y^t_g = \frac{e^{z^t_g}}{e^{z^t_k} + e^{z^t_g}} \quad (3)$$

To compute the signal error or the objective function derivatives with respect to the unnormalized outputs, consider the example in FIG. 4. It is assumed that the signal error at frame t for garbage (keyword) is denoted by $\delta^t_g$ ($\delta^t_k$). In this example, different cost function is used for different parts of the training sequence. In particular, the cross entropy cost function is used for non-ROT ($0 \le t < r$ or $r+N-1 < t \le T-1$). This is because in this region, the probability of having no spike should be maximized. But the proposed CTC algorithm is used for ROT. So the signal error for each region can be computed as follows.

a) if frame t is in non-ROT ($0 \le t < r$ or $r+N-1 < t \le T-1$):

$$\delta^t_g = 1 - y^t_g$$

$$\delta^t_k = -\delta^t_g \quad (4)$$

b) if frame t is in ROT ($r \le t \le r+N-1$):

$$\delta^t_g = Y^t_g - y^t_g \quad (5)$$

$$\delta^t_k = -\delta^t_g$$

where $$Y^t_g = \frac{Z_0 - G}{Z_0 + Z_1 - G}$$

$$Z_0 = \exp(\hat{\alpha}_t(0) + \hat{\beta}_t(0) - \log(y^t_g))$$

$$Z_1 = \exp(\hat{\alpha}_t(1) + \hat{\beta}_t(1) - \log(1 - y^t_g))$$

$$G = \exp\left(\sum_{t=r}^{R+N-1} \log(y^t_g)\right)$$

where $Z_0$ ($Z_1$) is the probability of all the paths that go through the symbol s=0 (s=1) at time t. G is the probability of the path that includes no keyword. As the goal is to have at least one spike in the ROT, this probability is subtracted as it can be seen in Formula (5).

3) Adaptive Learning Rate (See, Reference 216, FIG. 2)

In order to improve the performance and increase the training convergence rate, an adaptive learning rate algorithm can be utilized in some embodiments. Two embodiments for updating the weights and biases of the network are described below. The weights and biases connected to the output layer are updated according to the following rule for i-th epoch.

$$X_{weight}(i) = m \times \Delta_{weight}(i-1) + \mu \times \delta_{weight}(i) \quad (6)$$

$$\Delta_{weight}(i) = \begin{cases} X_{weight}(i) & \text{if } \theta^{weight}_{low} \le X_{weight}(i) \le \theta^{weight}_{up} \\ \Delta_{weight}(i-1) & \text{otherwise} \end{cases}$$

$$\text{update} = \begin{cases} X_{weight}(i) & \text{if } \theta^{weight}_{low} \le X_{weight}(i) \le \theta^{weight}_{up} \\ 0 & \text{otherwise} \end{cases}$$

$$\text{weight}(i) = \text{weight}(i-1) + \text{update}$$

Where m is the momentum (e.g., m=0.9) and $\mu$ is the learning rate (e.g., $\mu$=1e-3). $\theta^{weight}_{low}$ and $\theta^{weight}_{up}$ are the lower bound and upper bound for the update of the weights (or the biases). $\delta_{weight}(i)$ is the error signal which is received at the corresponding weights (or biases) using the standard BPTT. For example, for bias of the garbage node of the output layer, $\delta_{weight}(i)$ equals to $\delta^t_g$ for t-th frame. As shown in Formula (6), the weights (or the biases) at each epoch are updated using the "update" value. For other weights and biases of the neural network, the following rule may be used to update them.

$$\text{initialization for the first epoch} \to E(0) = 0 \quad (7)$$

$$E(i) = \rho \times E(i-1) + (1-\rho) \times (\delta_{weight}(i))^2$$

$$RMS = \sqrt{E(i) + \varepsilon}$$

$$X_{weight}(i) = \frac{\mu}{RMS} \delta_{weight}(i)$$

$$\text{update} = \begin{cases} X_{weight}(i) & \text{if } \theta^{weight}_{low} \le X_{weight}(i) \le \theta^{weight}_{up} \\ 0 & \text{otherwise} \end{cases}$$

$$\text{weight}(i) = \text{weight}(i+1) + \text{update}$$

where $\rho$ is a smoothing factor (e.g, $\rho$=0.95) is a smoothing factor and c can be a fixed constant to avoid infinity (e.g., $\varepsilon$=1e-6) can be a fixed constant to avoid infinity. The other parameters may be similar to what is discussed above.

FIG. 5 illustrates an exemplary binary classification training system 500 of some embodiments that performs at least part of the binary classification training process described above. The binary classification training system 500 is programmed to perform the training processes described above. The binary classification training system includes the training dataset 537 which contain the pre-segmented labeled training data. Training dataset 537 is connected to the binary classification training module 540 which includes the ROT table 544. The ROT table is built using the information about the segmented training data provided by training dataset 537. The binary classification training module 540 also includes a forward pass processing module 541 programmed to perform the forward pass process described above and a backward pass processing module 542 programmed to perform the backward pass processes described above. The adaptive learning module 543 includes one or more adaptive learning algorithms that can be used by the backward pass processing module to update the weights and biases of a neural network, such as the LSTM network, as described above.

In some of these embodiments, the binary classification training module 540 can iteratively perform the training processes using different training data to continuously improve and update the neural network. The binary classification training module 540 can store the updated neural network in the memory 528. The processor 520, can be a micro-controller, a digital signal processor (DSP), or other processing components, for controlling and facilitating the operations of the binary classification training system 500, including controlling communications with internal and external devices.

The binary classification training system 500 includes one or more communication channels such as a bus for facilitating communication of data between various components of the binary classification system 500. Components may include device modules 525 for providing device operation and functionality, which may include input/output components 526 such as a touch screen, keyboard, mouse, etc., a display 527 such as a monitor, a memory 528 such as RAM, solid state drive, disk drive, database, etc., and a communications interface 529.

Training the neural network is performed by binary classification training system 500 offline and the trained model including the weights and biases of the neural network, such as an LSTM network, is stored in Binary classification system 600.

Figure 6:
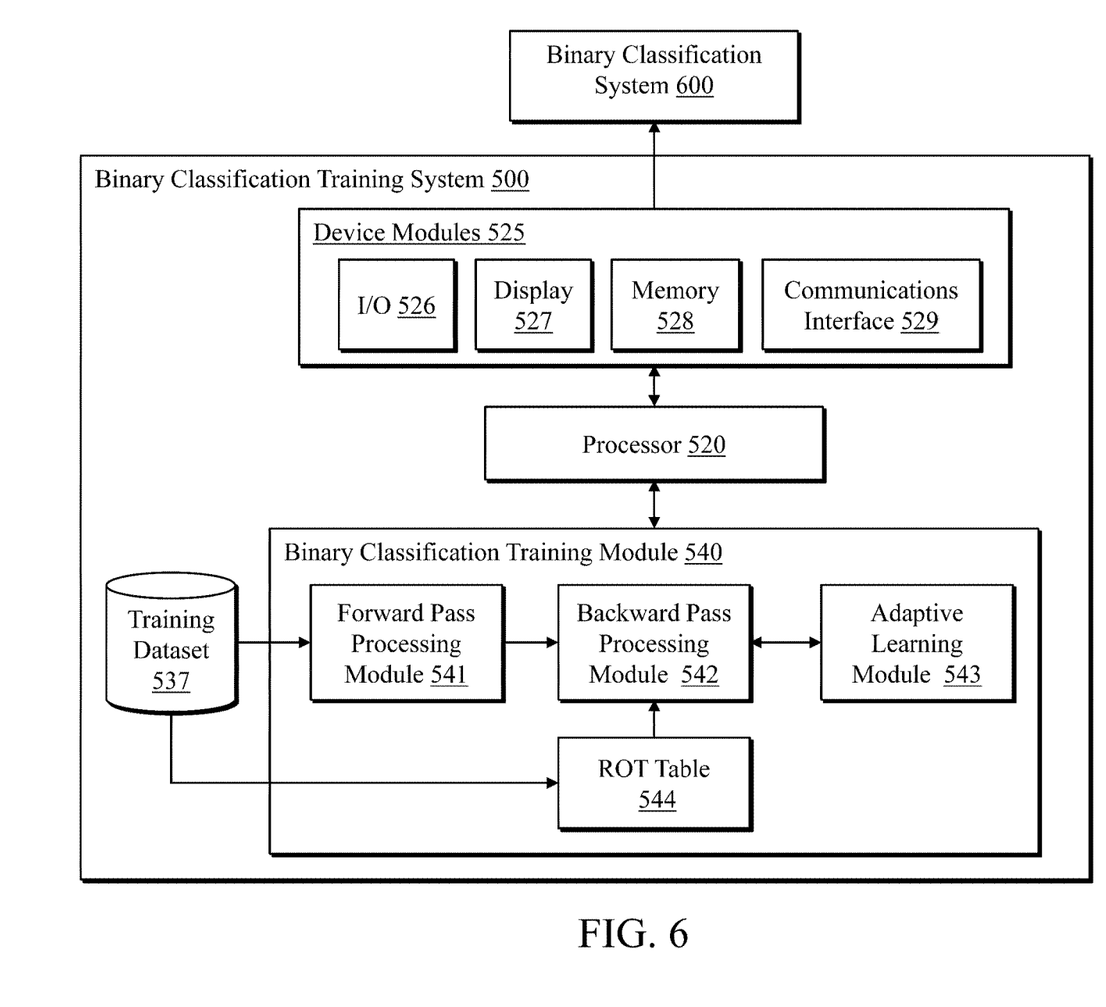
FIG. 6 is a block diagram illustrating a binary classification training system, in accordance with an embodiment.
Figure 7:
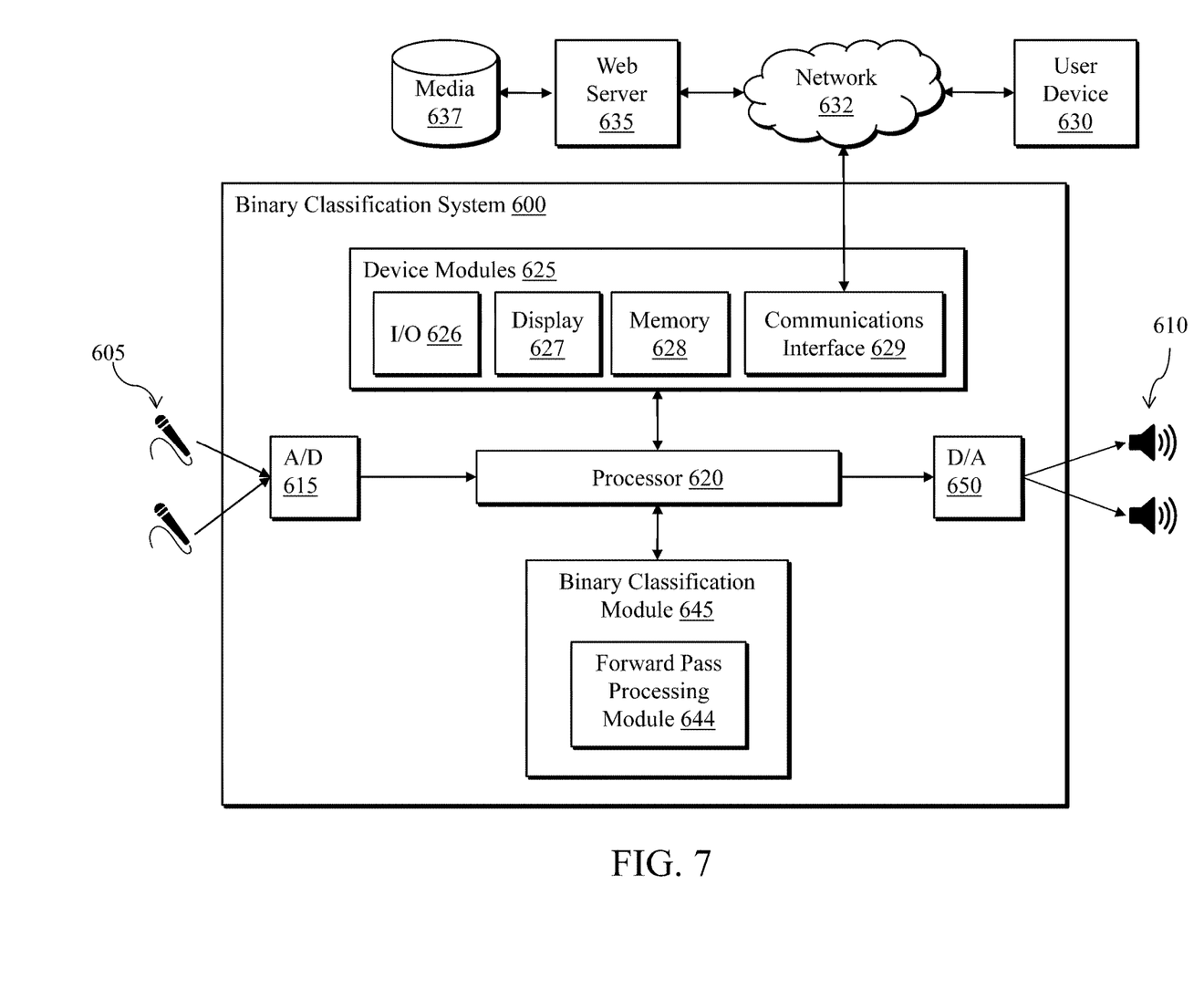
FIG. 7 is a block diagram illustrating a binary classification system, in accordance with an embodiment.

FIG. 6 illustrates an exemplary binary classification system 600 of some embodiments that performs at least part of the binary classification training process described above. The binary classification system 600 may be implemented as a mobile device, such as a smart phone or a laptop computer, a television or display monitor, a display computer, a computer server, an automobile, a speech recognition system, or any other device that provides audio keywords (e.g., commands) recognition capability. The binary classification system 600 is communicatively coupled with one or more audio inputting devices 605 such as a microphone and optionally also with one or more audio outputting devices 610 such as a loudspeaker.

In some embodiments, the binary classification system 600 can include an analog-to-digital converter 615 that converts the analog audio signals received from the audio inputting devices 605 into digital audio signals and sends the digital audio signals to processor 620, which can be a micro-controller, a digital signal processor (DSP), or other processing components, for controlling and facilitating the operations of the binary classification system 600, including controlling communications with internal and external devices. The binary classification system 600 may also include a digital-to-analog converter 650 that converts digital audio signals generated by the different modules and components of the binary classification system 600 to analog signals before transmitting the analog signals to the one or more audio outputting devices 610.

The binary classification system 600 includes one or more communication channels such as a bus for facilitating communication of data between various components of the binary classification system 600. Components may include device modules 625 for providing device operation and functionality, which may include input/output components 626 such as a touch screen, keyboard, mouse, etc., a display 627 such as a monitor, a memory 628 such as RAM, solid state drive, disk drive, database, etc., and a communications interface 629. In some embodiments, the communications interface 629 may include a network interface (e.g., Ethernet interface) or a wireless transceiver for enabling the binary classification system to communicate with remote devices over a network 632. Remote devices may include user devices 630 (e.g., household appliances, other user electronics, etc.), or a web server 635 that is communicatively coupled with a media storage 637.

The binary classification system 600 also includes a binary classification module 645 programmed to use the neural network that was trained and updated by the binary classification training system 500. The binary classification module includes the forward pass processing module 644. In one embodiment, forward pass processing module 644 is programmed to perform binary classification and prediction on audio input data received from audio inputting devices 605. In various embodiments, binary classification module 645 may include an automatic speech recognition (ASR) module providing voice command processing, an image search and classification system, an object detection system, medical diagnostic module, or other application configured for use with the neural network as described herein. As mentioned, for a given set of audio input data, the forward pass processing module 644 can produce either one of only two possible responses (e.g., a positive response or a negative response). Preferably, the forward pass processing module 644 can generate a response based on a neural network in real-time or close to real-time of the audio input. In some embodiments, the binary classification module 645 can be programmed to output the response as an audio sound via the digital-to-analog converter 650 and the audio outputting devices 610. Instead of or in addition to producing an audio signal, the binary classification module 645 can be programmed to send a signal to an external device (e.g., to initiate an action or a transaction through the external device) based on the generated response. For example, the binary classification system 600 can be part of or communicatively coupled with a smart home system, and send a signal to a user device (e.g., a household appliance) via a network 632 (e.g., a local area network within the user's residence) based on the generated response (e.g., sending a signal to turn on the television based on the response generated by an audio input from the user). In another example, the binary classification system 600 can initiate a transaction with a web server 635 over the Internet based on the generated response (e.g., sending a signal to the web server 635 to purchase a movie stored in media storage 637 based on the response generated by an audio input from the user). The binary classification system disclosed herein is not limited to processing audio signals, but can be used to train a neural network to process different input (e.g., image data, video data, etc.) as well.

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably program the computing device to provide the roles, responsibilities, or other functionality as discussed above with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer-implemented method for training a neural network comprising:
    receiving, at a computing device, a stream of segmented, labeled training data having a sequence of frames;
    computing, by the computing device, a stream of input features data for the sequence of frames;
    generating, by the computing device, neural network outputs for the sequence of frames in a forward pass through the training data and in accordance weights and biases;
    updating, by the computer device, weights and biases in a backward pass through the training data, the backward pass comprising:
        determining Region of Target (ROT) information from the stream of segmented, labeled training data;
        computing modified forward and backward variables based on the neural network outputs and the ROT information;
        deriving a signal error for each frame within the sequence of frames based on the modified forward and backward variables; and
        updating the weights and biases based on the derived signal error.

2. The computer-implemented method of claim 1, wherein the neural network comprises a recurrent neural network.

3. The computer-implemented method of claim 1, further comprising storing the neural network outputs for the sequence of frames in a buffer.

4. The computer-implemented method of claim 1, wherein the backward pass further comprises starting from a last frame in the sequence of frames and going backward in time to compute the signal error for each frame at the input of a softmax node.

5. The computer-implemented method of claim 4 further comprising propagating the signal error backwards through the neural network using back propagation through time.

6. The computer-implemented method of claim 1 wherein each sequence of frames includes a ROT.

7. The computer-implemented method of claim 1 wherein determining the ROT information further comprises determining a beginning of the ROT and determining an end of the ROT.

8. The computer-implemented method of claim 7 wherein the ROT information is used to compute the signal error.

9. The computer-implemented method of claim 1 wherein the signal error is further computed based on network outputs and an estimated soft target.

10. The computer-implemented method of claim 1, further comprising adaptively learning to improve a convergence rate of the neural network by determining a momentum for the weights and biases of an output layer, and computing the root mean square of gradients for the weights and biases not in the output layer.

11. A classification training system comprising:
    a neural network operable to classify input data;
    a training dataset providing segmented labeled training data comprising a sequence of frames; and
    a classification training module operable to train the neural network using the segmented labeled training data, the classification training module comprising a forward pass processing module and a backward pass processing module;
    wherein the forward pass processing module is operable to train the neural network by generating neural network outputs for the training data using weights and biases for the neural network; and
    wherein the backward pass processing module is operable to train the neural network by updating the weights and biases by passing backward through generated neural network outputs, the backward pass processing module operable to:
        determine Region of Target (ROT) information from the segmented, labeled training data;
        compute modified forward and backward variables based on the neural network outputs and the ROT information;
        derive a signal error for each frame within the sequence of frames based on the modified forward and backward variables; and
        update the weights and biases based on the derived signal error.

12. The classification training system of claim 11, wherein the neural network comprises a recurrent neural network.

13. The classification training system of claim 11, wherein the forward pass processing module is further operable to store the neural network outputs for the frames in the sequence of frames in a buffer.

14. The classification training system of claim 11, wherein the backward pass processing module further comprises starting from a last frame in the sequence of frames and going backward in time to compute the signal error for each frame at an input of a softmax node.

15. The classification training system of claim 14, wherein the backward pass processing module is further operable to propagate the signal error backwards through the neural network using back propagation through time.

16. The classification training system of claim 11, wherein each sequence of frames includes a ROT.

17. The classification training system of claim 11, wherein the backward pass processing module is further operable to determine a beginning of the ROT and an end of the ROT.

18. The classification training system of claim 17, wherein the ROT information is used to compute the signal error.

19. The classification training system of claim 11, wherein the signal error is further computed based on network outputs and an estimated soft target.

20. The classification training system of claim 11, further comprising an adaptive learning module operable to improve a convergence rate of the neural network by determining a momentum for the weights and biases of an output layer, and computing the root mean square of gradients for the weights and biases not in the output layer.

* * * * *